United States Patent
Masuoka et al.

(10) Patent No.: US 9,942,483 B2
(45) Date of Patent: Apr. 10, 2018

(54) INFORMATION PROCESSING DEVICE AND METHOD USING DISPLAY FOR AUXILIARY LIGHT

(71) Applicant: HITACHI MAXELL, LTD., Osaka (JP)

(72) Inventors: Nobuo Masuoka, Osaka (JP);
Masayuki Hirabayashi, Osaka (JP);
Hideo Nishijima, Osaka (JP);
Kazuhiko Yoshizawa, Osaka (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/914,738

(22) PCT Filed: Aug. 30, 2013

(86) PCT No.: PCT/JP2013/073241
§ 371 (c)(1),
(2) Date: Feb. 26, 2016

(87) PCT Pub. No.: WO2015/029199
PCT Pub. Date: Mar. 5, 2015

(65) Prior Publication Data
US 2016/0212318 A1    Jul. 21, 2016

(51) Int. Cl.
*H04N 5/235* (2006.01)
*H04N 5/232* (2006.01)

(52) U.S. Cl.
CPC ......... *H04N 5/2354* (2013.01); *H04N 5/2351* (2013.01); *H04N 5/23219* (2013.01); *H04N 5/23293* (2013.01)

(58) Field of Classification Search
CPC ............. H04N 5/2354; H04N 5/23219; H04N 5/23293; H04N 5/2351
See application file for complete search history.

(56) References Cited

U.S. PATENT DOCUMENTS 7,663,691 B2 *   2/2010   Ciudad ................ H04N 5/2354
                                                        348/216.1
7,903,143 B2 *   3/2011   Seddik ................ H04N 5/2256
                                                        348/207.99
(Continued)

FOREIGN PATENT DOCUMENTS

JP    2004-187154 A      7/2004
JP    2005-286440 A     10/2005
(Continued)

OTHER PUBLICATIONS

International Search Report of PCT/JP2013/073241.
Japanese Office Action received in corresponding Japanese Application No. 2015-533877 dated Jul. 25, 2017.

*Primary Examiner* — Nicholas Giles
(74) *Attorney, Agent, or Firm* — Mattingly & Malur, PC

(57) ABSTRACT

In an information processing device configured to include an imaging unit, a display unit, and an illumination sensor, to capture image information by the imaging unit, and to perform processing on the captured image information, the display unit and the imaging unit are disposed on the same surface, the capture processing is performed in a normal mode when a detected value of the illumination sensor is a predetermined value or more, and the capture processing is performed in a dark-place mode when the detected value of the illumination sensor is a predetermined value or less.

10 Claims, 16 Drawing Sheets

(56) References Cited

U.S. PATENT DOCUMENTS

| | | | |
|---|---|---|---|
| 8,199,249 B2* | 6/2012 | Ciudad | H04N 5/2354 348/216.1 |
| 8,605,205 B2* | 12/2013 | Ledbetter | H04N 5/2256 348/207.1 |
| 8,922,672 B2* | 12/2014 | Mahowald | H04N 5/23232 348/223.1 |
| 8,970,776 B2* | 3/2015 | Ciudad | H04N 5/2354 348/221.1 |
| 9,413,978 B2* | 8/2016 | Ciudad | H04N 5/2354 |
| 9,485,398 B2* | 11/2016 | Patel | H04N 5/20 |
| 2006/0078218 A1* | 4/2006 | Igarashi | H04N 5/23248 382/255 |
| 2007/0081094 A1* | 4/2007 | Ciudad | H04N 5/2354 348/371 |
| 2009/0115880 A1* | 5/2009 | Wada | G03B 17/18 348/333.01 |
| 2009/0160945 A1* | 6/2009 | Chung | H04N 5/23293 348/207.1 |
| 2009/0175555 A1* | 7/2009 | Mahowald | H04N 5/23232 382/274 |
| 2009/0207281 A1* | 8/2009 | Ono | H04N 5/23245 348/234 |
| 2009/0213247 A1* | 8/2009 | Tanaka | H04N 5/2354 348/240.99 |
| 2009/0231483 A1* | 9/2009 | Seddik | H04N 5/2256 348/373 |
| 2009/0273661 A1* | 11/2009 | Mauchly | H04N 5/2256 348/14.08 |
| 2009/0322889 A1* | 12/2009 | Kujawa | H04N 5/2354 348/207.99 |
| 2010/0118179 A1* | 5/2010 | Ciudad | H04N 5/2354 348/371 |
| 2011/0115833 A1* | 5/2011 | Shimoyama | G09G 5/10 345/690 |
| 2012/0108291 A1 | 5/2012 | Sumisaki | |
| 2012/0249855 A1* | 10/2012 | Ciudad | H04N 5/2354 348/333.01 |
| 2014/0225980 A1* | 8/2014 | Patel | H04N 5/20 348/14.08 |
| 2014/0285699 A1* | 9/2014 | Kato | G09G 3/3406 348/333.12 |
| 2015/0002735 A1* | 1/2015 | Moskovchenko | H04N 5/2354 348/370 |
| 2015/0116586 A1* | 4/2015 | Mahowald | H04N 5/23232 348/370 |
| 2015/0181101 A1* | 6/2015 | Ciudad | H04N 5/2354 348/371 |
| 2016/0037042 A1* | 2/2016 | Zhang | H04N 5/23293 348/370 |

FOREIGN PATENT DOCUMENTS

| | | |
|---|---|---|
| JP | 2008-107942 A | 5/2008 |
| JP | 2011-13459 A | 1/2011 |
| JP | 2011-109483 A | 6/2011 |

* cited by examiner

FIG. 2
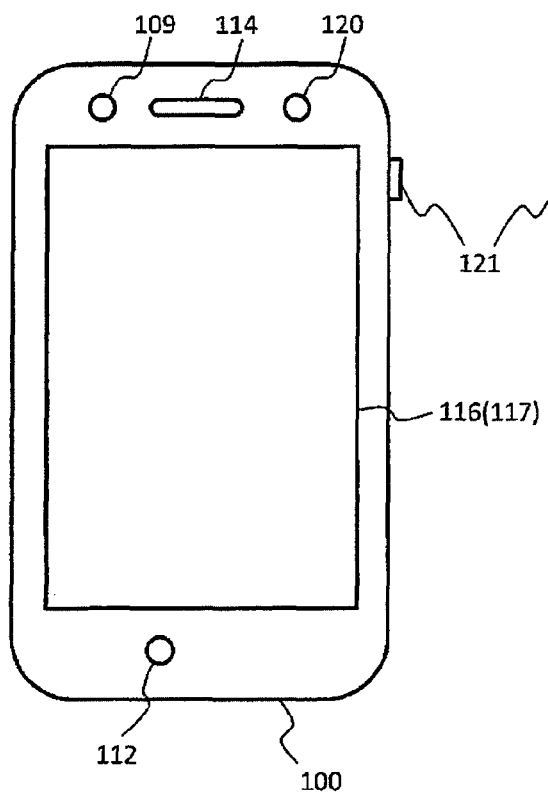
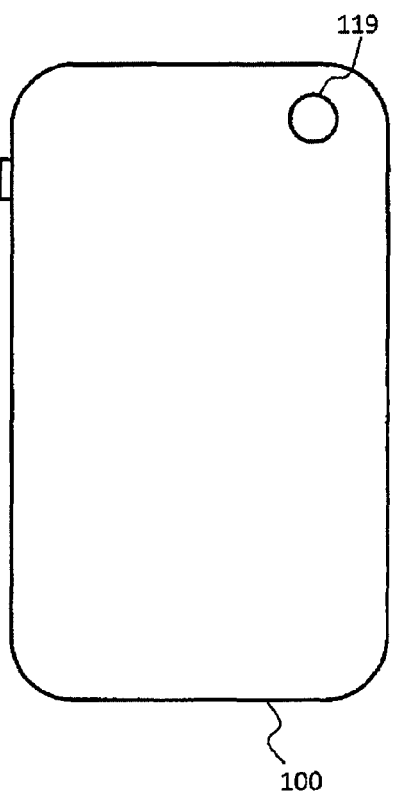
FIG. 3
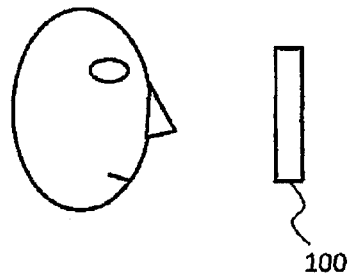
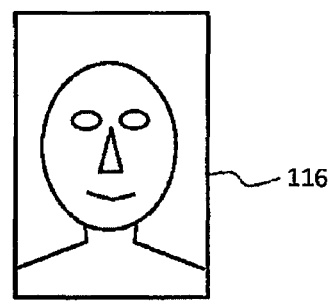

INFORMATION PROCESSING DEVICE AND METHOD USING DISPLAY FOR AUXILIARY LIGHT

TECHNICAL FIELD

The present invention relates to an information processing device, an information processing method, and a program.

BACKGROUND ART

The background art of the present technical field includes Patent Document 1. Patent Document 1 describes that "in the information terminal equipped with a camera including a camera (the imaging unit) and a display device, the display device is made to light as the auxiliary light by performing a display based on the 100% white signal at the time of photographing.

RELATED ART DOCUMENT

Patent Document

Patent Document 1: Japanese Patent Application Laid-Open Publication No. 2005-286440

SUMMARY OF THE INVENTION

Problems to be Solved by the Invention

The information processing device described in the Patent Document 1 enables a good photographing even in a dark environment. However, the time of the checking the photographed image before the photographing is not considered at all. When the photographing is performed by the information processing device, the image photographed by the imaging unit is displayed on the display unit, and the user checks the image information displayed on the display unit and adjusts the position of the information processing device so as to be able to photograph a desired image. In the information processing device described in the Patent Document 1, when the photographing is performed in a dark environment, the display unit acts as the auxiliary light, and thus, a good image can be photographed. However, at the time of the checking before the photographing, a dark image is displayed on the display unit; therefore the image to be displayed thereon may be too dark to be checked in a very dark environment.

The present invention solves the problems described above, and provides a more user-friendly information processing device, information processing method, and a program for realizing this.

Means for Solving the Problems

The following is a brief description of an outline of the typical invention disclosed in the present application.

(1) An information processing device includes an imaging unit, a display unit and an illumination sensor. The imaging unit and the display unit are disposed on a first surface side of the information processing device, and there is provided a mode of using at least part of the display unit as auxiliary light, in a case of taking an image by the imaging unit when a detected value of the illumination sensor is a predetermined value or less.

(2) In the information processing device described in (1), in a case of taking an image by the imaging unit when a detected value of the illumination sensor is a predetermined value or less, image information captured by the imaging unit is displayed in a first region of the display unit, and image information different from the image information is displayed in a second region of the display unit at luminance higher than luminance in the first region.

(3) In an information processing method using an information processing device including an imaging unit, a display unit, and an illumination sensor, the method includes the steps of detecting illumination by the illumination sensor; and setting a mode of using at least part of the display unit as auxiliary light, in a case of taking an image by the imaging unit when a detected value of the illumination sensor is a predetermined value or less.

(4) There is provided a program for causing an information processing device including an imaging unit; a display unit; and an illumination sensor, to execute a step of setting a mode of using at least part of the display unit as auxiliary light, in a case of taking an image by the imaging unit when a detected value of the illumination sensor is a predetermined value or less.

Effects of the Invention

The present invention can solve the problems described above, and provide a more user-friendly information processing device, information processing method, and a program for realizing this.

BRIEF DESCRIPTIONS OF THE DRAWINGS

FIG. 1 is a block diagram illustrating an example of an internal configuration of an information processing device.

FIGS. 2(a) and 2(b) are external diagrams of the information processing device.

FIGS. 3(a) and 3(b) are diagrams showing a state where a user photographs himself/herself.

Figure 10:
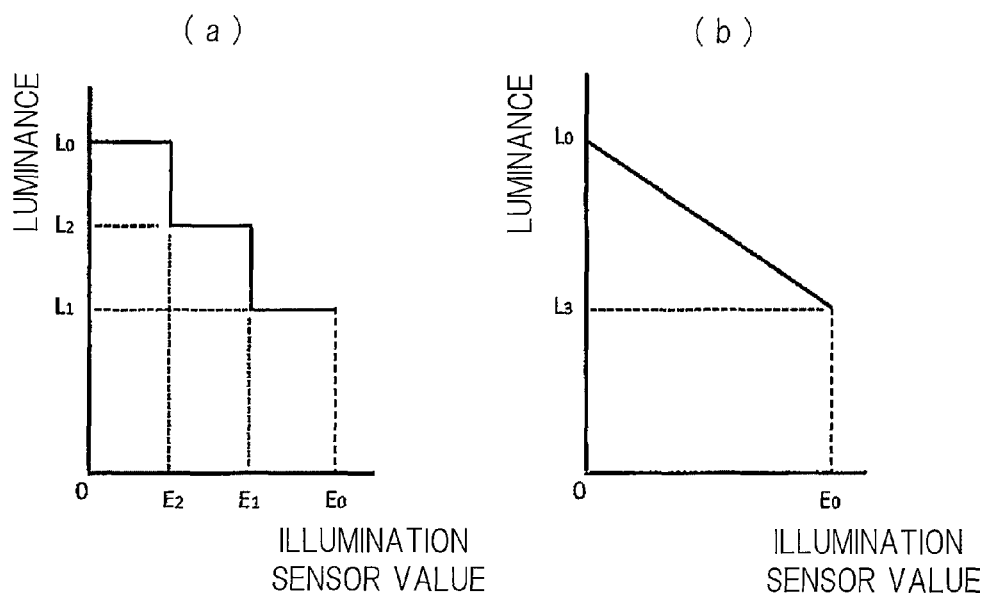

FIGS. 10(a) and 10(b) are diagrams illustrating other relationship examples between the values detected by the illumination sensor and the luminance of the auxiliary light display in the first region, in the dark-place mode.

Figure 11:
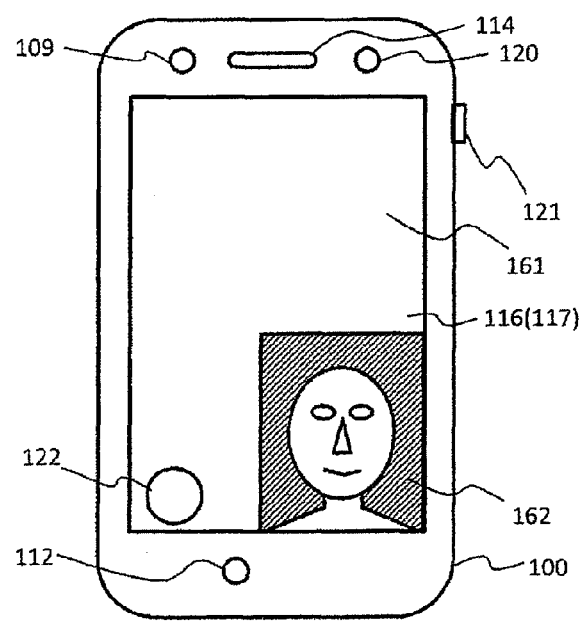

FIG. 11 is a diagram illustrating another display example of the display unit in the dark-place mode.

Figure 12:
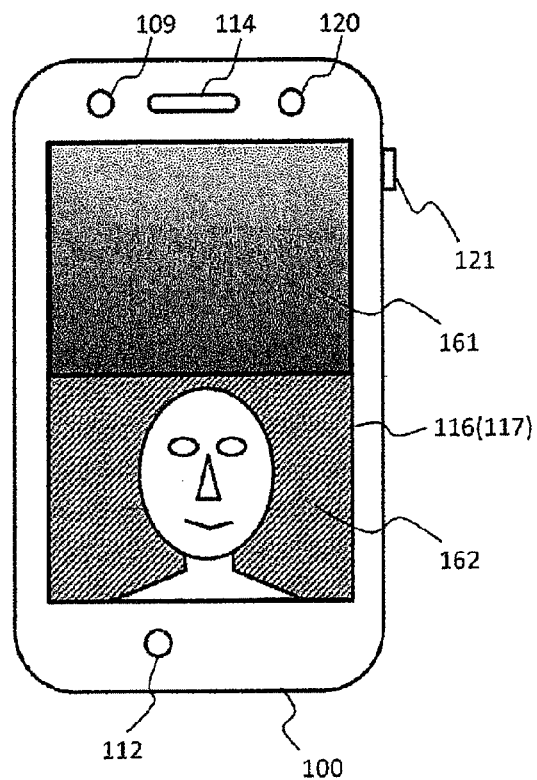

FIG. 12 is a diagram illustrating another display example of the display unit in the dark-place mode.

Figure 13:
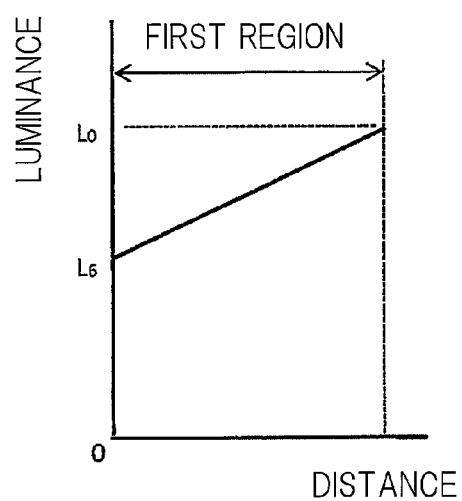

FIG. 13 is a diagram illustrating a relationship between the distance from a second region and the luminance in the first region.

Figure 14:
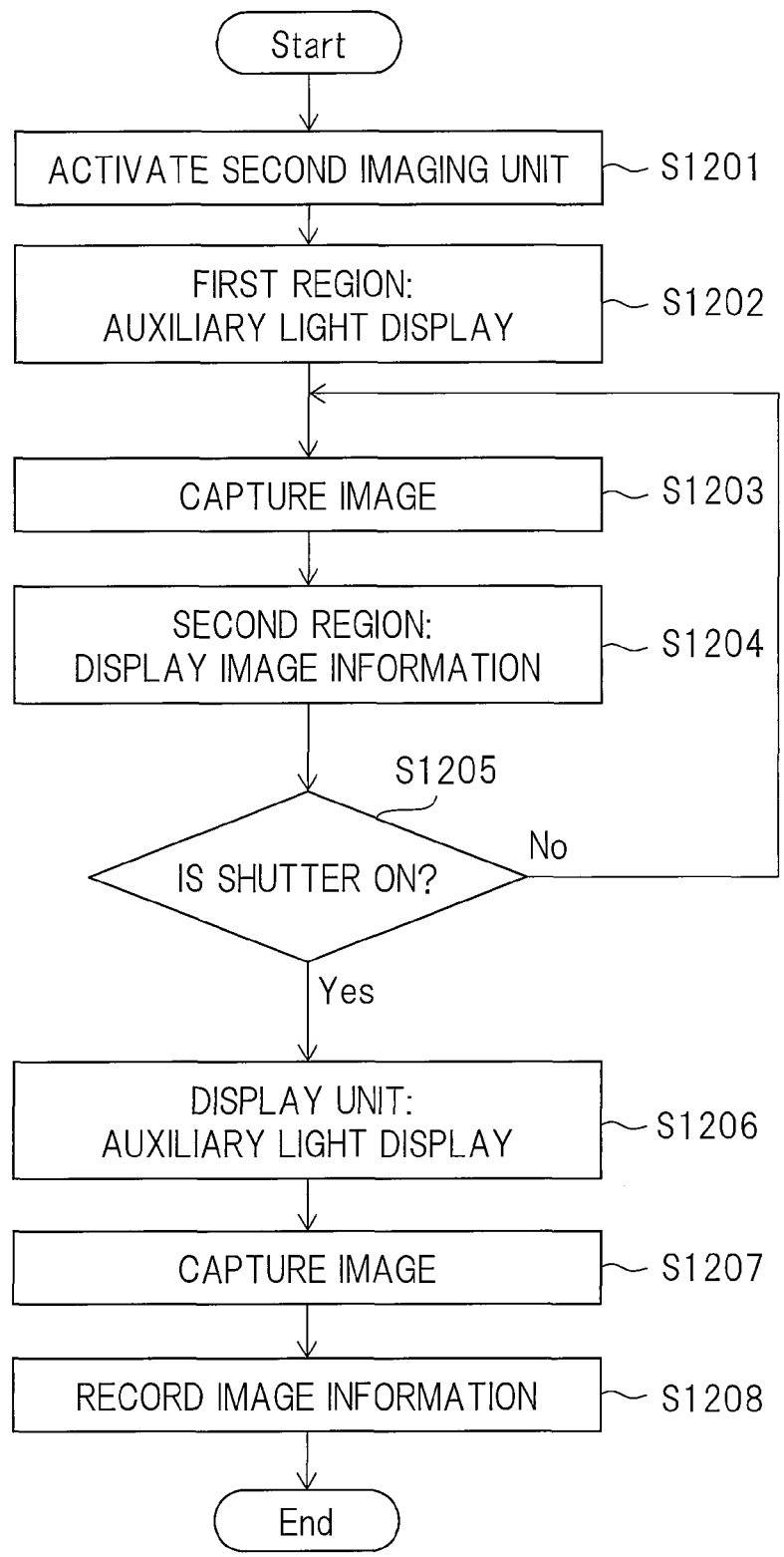

FIG. 14 is a flow chart illustrating the operation of the image-capture processing in the dark-place mode in a second embodiment.

Figure 15:
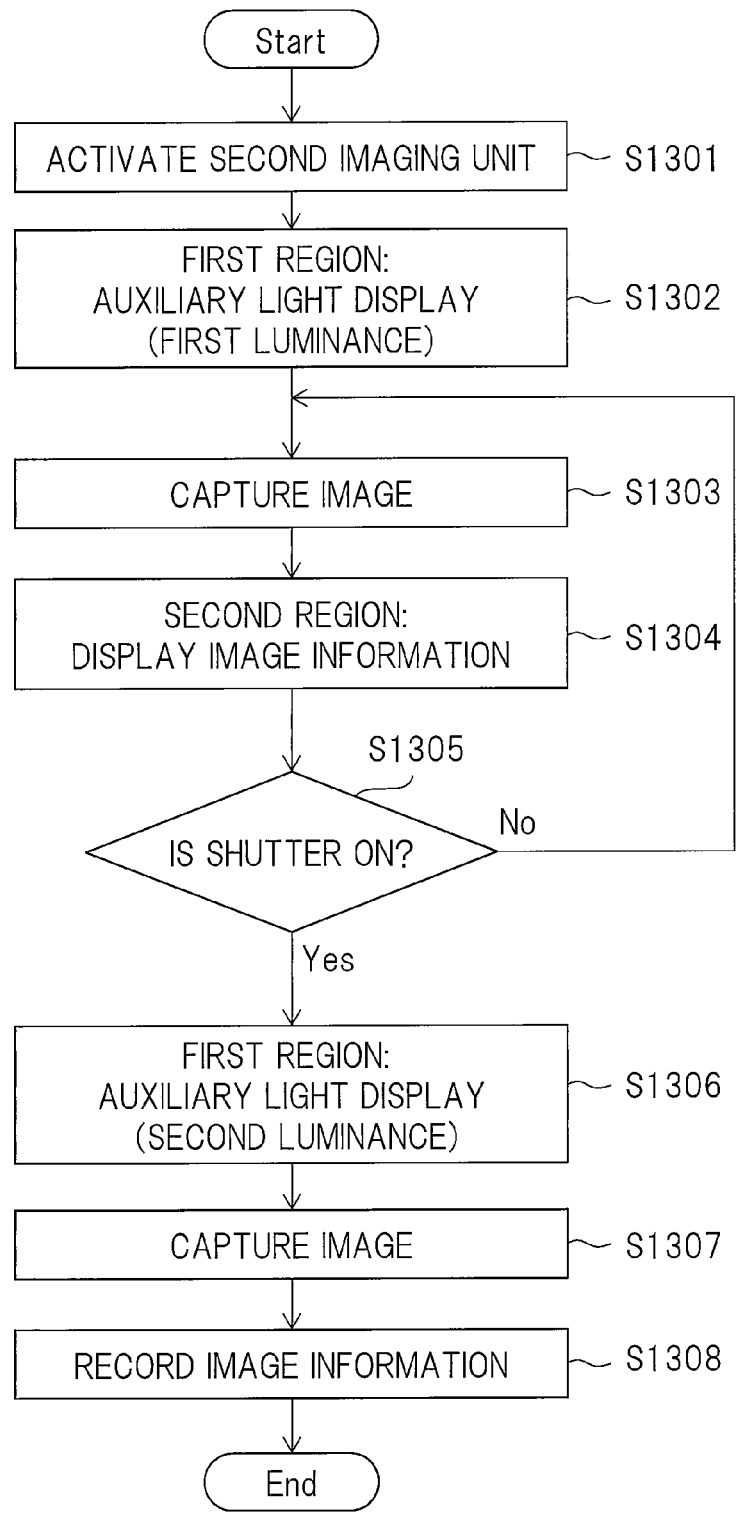

FIG. 15 is a flow chart illustrating the operation of the image-capture processing in the dark-place mode in a third embodiment.

Figure 16:
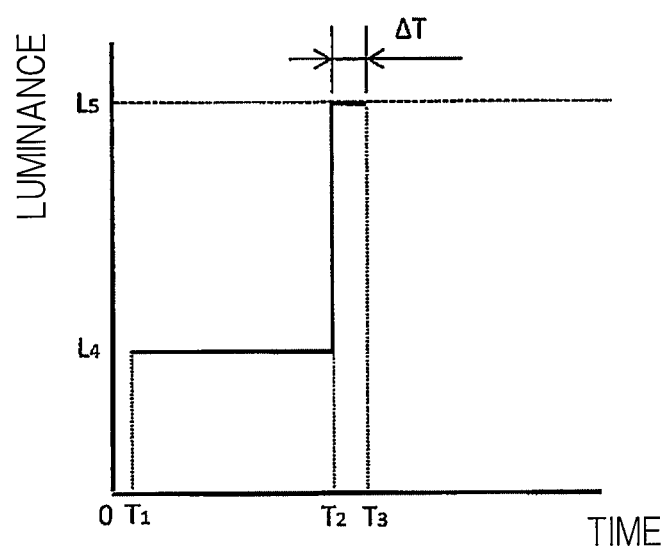

FIG. 16 is a diagram illustrating a relationship between the time from the start of the processing and the luminance in the first region.

Figure 17:
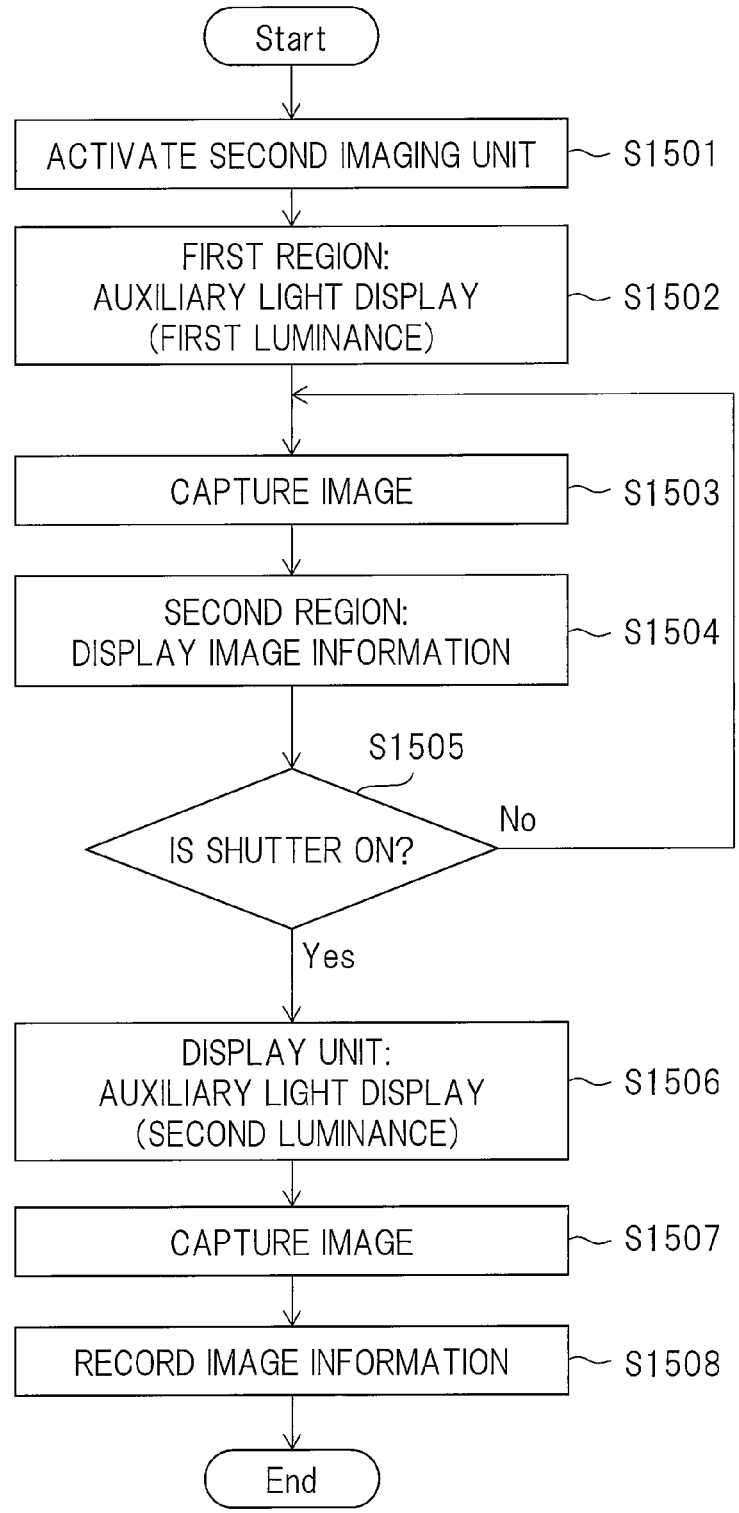

FIG. 17 is a flow chart illustrating the operation of the image-capture processing in the dark-place mode in a fourth embodiment.

Figure 18:
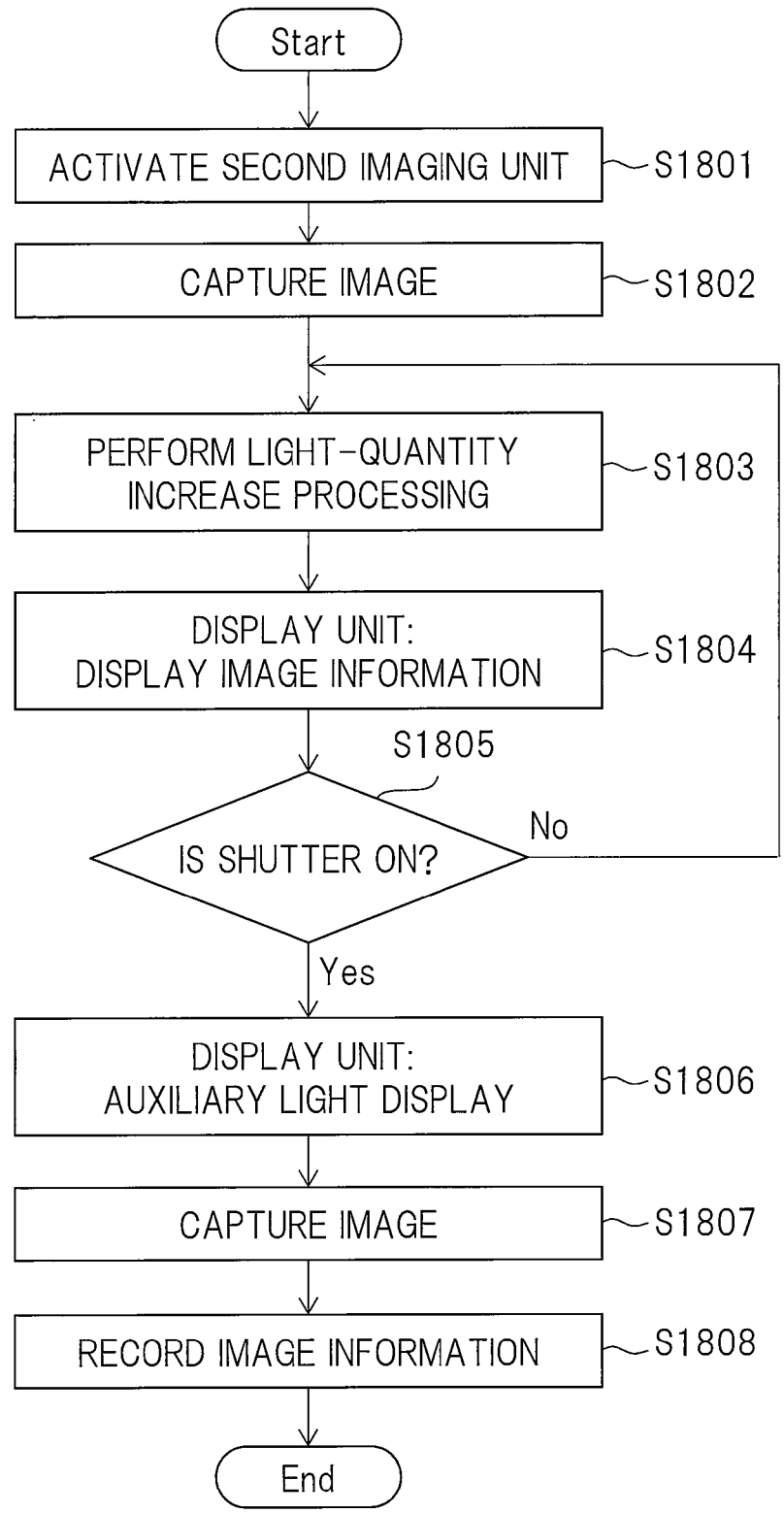

FIG. 18 is a flow chart illustrating the operation of the image-capture processing in the dark-place mode in a fifth embodiment.

Figure 19:
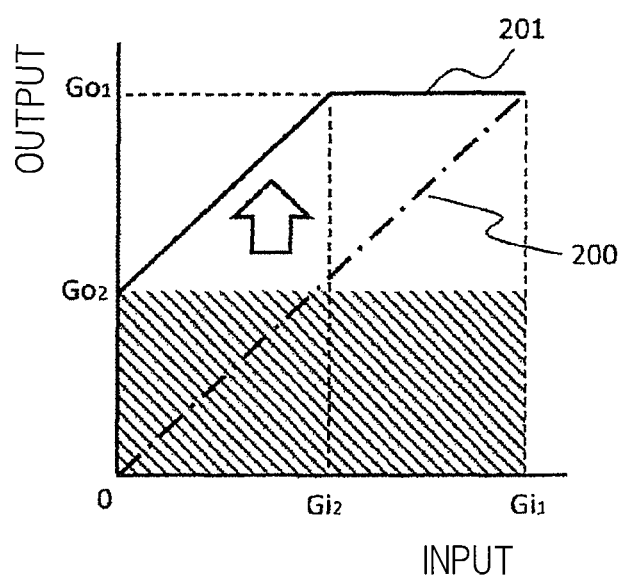

FIG. 19 is a diagram illustrating an example of light-quantity increase processing characteristics.

Figure 20:
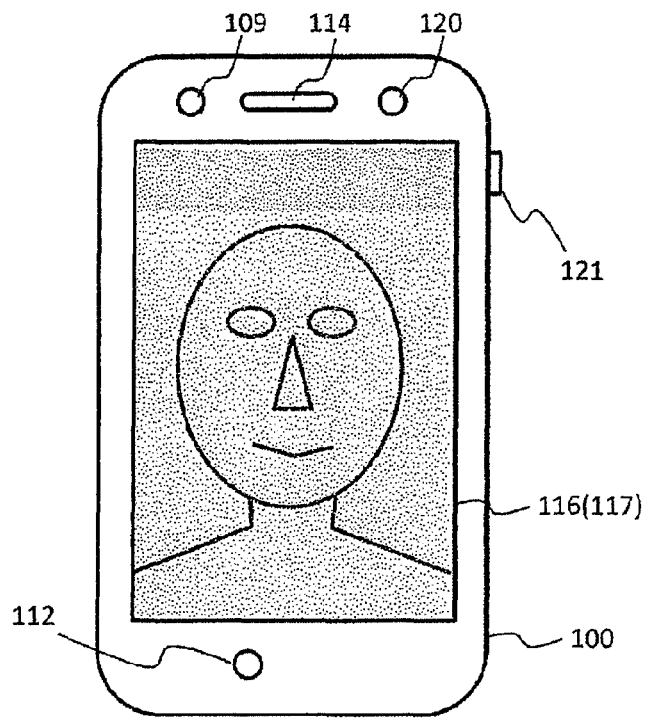

FIG. 20 is a diagram illustrating a state of the display unit.

Figure 21:
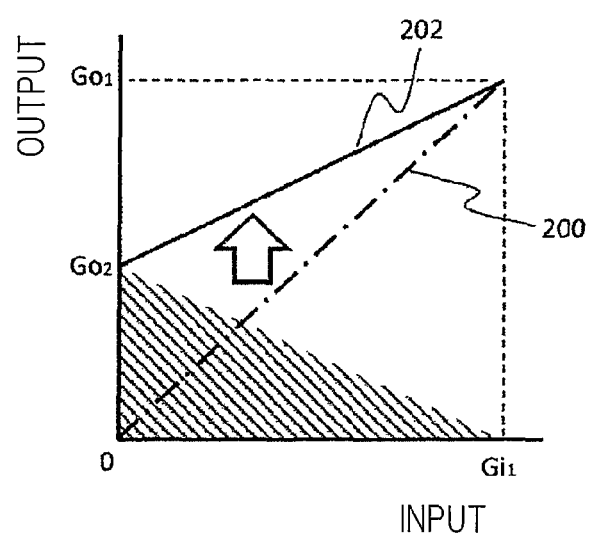

FIG. 21 is a diagram illustrating another example of the light-quantity increase processing characteristics.

DETAILED DESCRIPTION OF PREFERRED EMBODIMENTS

Figure 1:
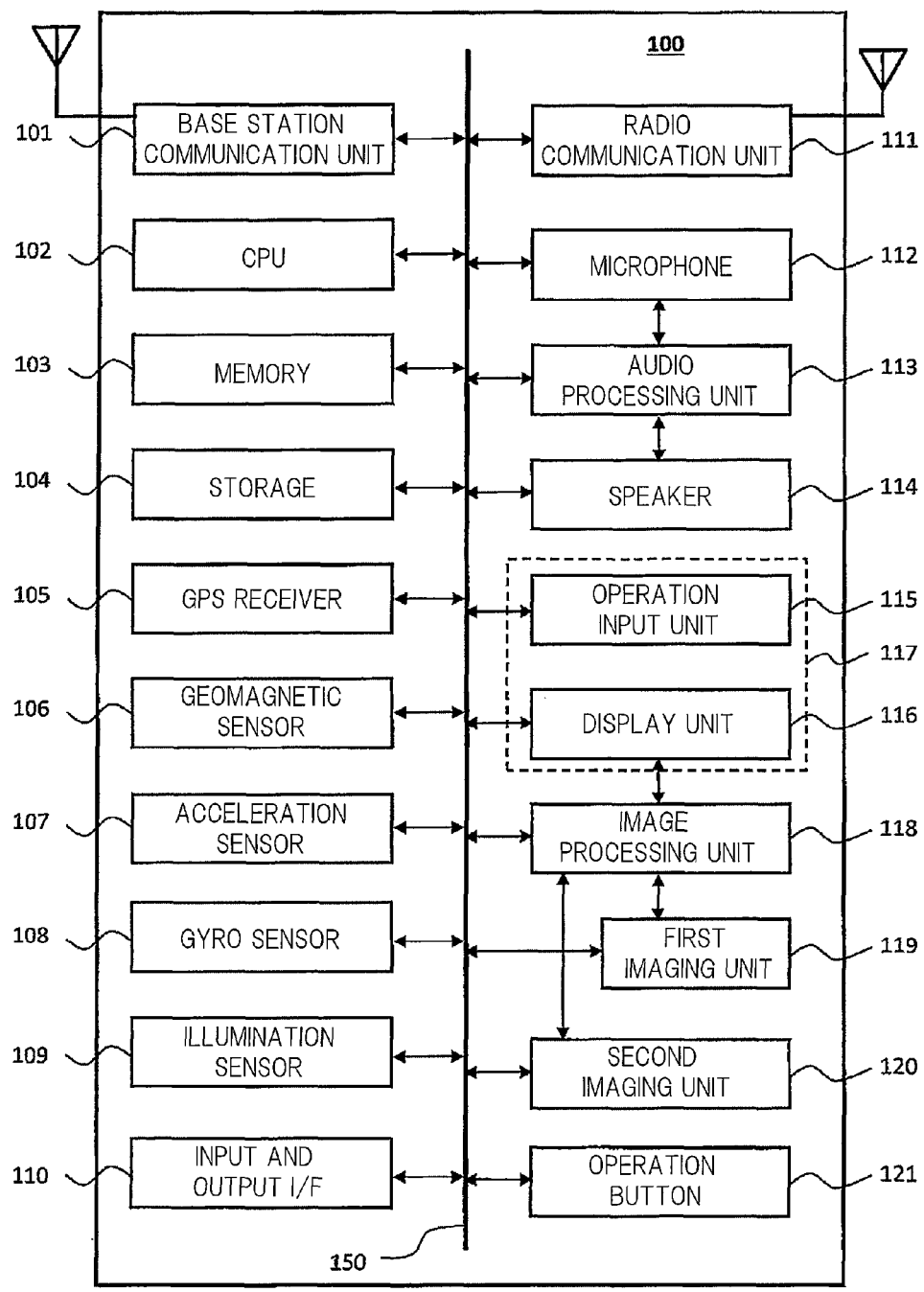

In the following, embodiments will be described with reference to the drawings.
First Embodiment FIG. 1 is a block diagram illustrating an example of an internal configuration of an information processing device 100 in a first embodiment. Here, the case of a smart phone will be described as an example. The information processing device 100 is configured by appropriately using units such as a base station communication unit 101, a CPU 102, a memory 103, a storage 104, a GPS (Global Positioning System) receiver 105, a geomagnetic sensor 106, an acceleration sensor 107, a gyro sensor 108, an illumination sensor 109, an input and output I/F 110, a radio communication unit 111, a microphone 112, an audio processing unit 113, a speaker 114, an operation input unit 115, a display unit 116, a touch panel 117, an image processing unit 118, a first imaging unit 119, a second imaging unit 120, and an operation button 121, and each of the units is connected to each other through a bus 150.

The base station communication unit 101 is a communication interface configured to perform a distant radio communication with a base station (not shown), such as W-CDMA (Wideband Code Division Multiple Access) and GSM (registered trademark) (Global System for Mobile communications).

The CPU 102 controls each unit and performs a variety of processing by executing the program stored in the memory 103.

The memory 103 is, for example, a flash memory and stores programs, data and the like. As for the program stored in the memory 103, the base station communication unit 101 performs the radio communication with a base station, and downloads the program from an external server and the like (not shown), whereby the program can be updated and added at any time. In addition, the information processing device 100 can mount storage 104 such as a memory card, and save data and the like also in the storage 104.

The GPS receiver 105 is for receiving signals from GPS satellites in the sky. Thus, the current positional information of the information processing device 100 can be detected.

The geomagnetic sensor 106 is a sensor configured to detect the direction where the information processing device 100 faces.

The acceleration sensor 107 is a sensor for detecting the acceleration of the information processing device 100, and the gyro sensor 108 is a sensor for detecting the angular velocity of the information processing device 100. By these sensors, the inclination and the movement of the information processing device 100 can be detected in detail.

The illumination sensor 109 is a sensor for detecting the brightness, and this makes it possible to know the ambient brightness of the information processing device 100.

The input and output I/F 110 is, for example, the USB (Universal Serial Bus) and the like, and is an interface configured to transmit and receive data to/from an external device (not shown).

The radio communication unit 111 is a communication interface configured to perform radio communication by a wireless LAN such as IEEE802.11a/b/n.

The microphone 112 inputs audio from the outside, and the speaker 114 outputs audio to the outside. The audio to be input and output is audio-processed by the audio processing unit 113.

The touch panel 117 is configured by appropriately using the operation input unit 115 and the display unit 116. The display unit 116 is a liquid crystal panel and the like, displays a video and an image, and includes the operation input unit 115 such as a touch pad on the display surface.

The operation input unit 115 is a touch pad such as that of electrostatic capacitance type, and detects the contact operation by a finger or a touch pen (hereinafter referred to as "touch") as an operation input. The operation input unit 115 displays, for example, the menu and the like of the command (function) on the display unit 116, detects the touch position by a user touching and selecting the desired command, and receives the command displayed in the touch position. The touch or the touch operation received by the operation input unit 115 is input to the CPU 102 and processed therein.

The first imaging unit 119 and the second imaging unit 120 are, for example, cameras and the like. The image displayed on the display unit 116, and the image input from the first imaging unit 119 and the second imaging unit 120 are processed by the image processing unit 118. It should be noted that in the present embodiment, the imaging unit disposed on the rear side of the information processing device 100 is set as the first imaging unit 119, and the imaging unit disposed on the front side (display surface side) is set as the second imaging unit 120.

The operation button 121 is a push button switch and the like, and when detecting that the operation button 121 is pressed, such detection is input to the CPU 102, and the operation corresponding to the operation button 121 is performed. When the information processing device 100 is in the mode of photographing by the first imaging unit 119 or the second imaging unit 120, the operation button 121 can function as a shutter button.

FIGS. 2(a) and 2(b) are external diagrams of the information processing device 100 in the first embodiment. FIG. 2(a) is a diagram seen from the front side, and FIG. 2(b) is a diagram seen from the rear side. As shown in FIGS. 2(a) and 2(b), the illumination sensor 109, the microphone 112, the speaker 114, the touch panel 117, and the second imaging unit 120 are disposed on the front side of the information processing device 100. In addition, the first imaging unit 119 is disposed on the rear side of the information processing device 100, and the operation button 121 is disposed on the side of the information processing device 100. The first imaging unit 119 photographs an image on the rear side of the information processing device 100, and the second imaging unit 120 photographs an image on the front side. In the case of photographing, the image information captured by the first imaging unit 119 or the second imaging unit 120 is to be displayed on the display unit 116, and thus, the display unit 116 can be used as a viewfinder. Hereinafter, displaying the captured image information as it is referred to as "through-display".

FIGS. 3(a) and 3(b) are diagrams showing a state where the user photographs himself/herself. When the user photographs himself/herself (for example, his/her face), as shown in FIG. 3(a), the information processing device 100 is disposed in front of his/her face. In this case, the surface (front) side on which the display unit 116 and the second imaging unit 120 are disposed is directed toward the user to be disposed. This is because the user himself/herself views the display unit 116 functioning as the viewfinder. Therefore, the photographing will be performed by the second imaging unit 120. As described above, the image information captured into the second imaging unit 120 is through-displayed on the display unit 116 during the photographing as shown in FIG. 3(b). The user can check the composition to be photographed by the second imaging unit 120 on the display unit 116. However, in the case of photographing in a dark environment, there are cases where the image through-displayed on the display unit 116 is a dark image, and it is difficult to check the composition. Thus, in the information processing device 100 in the present embodiment, a dark place mode is provided so as to cope with such cases. The details of the dark place mode will be described below.

Figure 4:
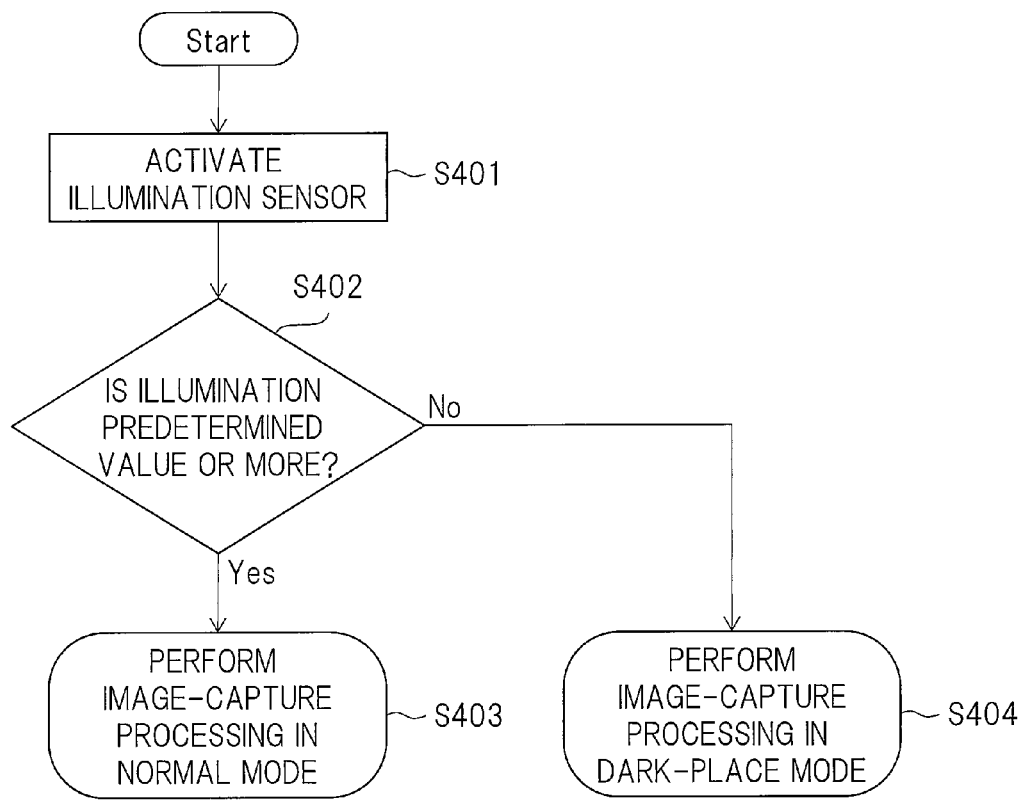
FIG. 4 is a flow chart illustrating the operation of mode selection of image capture by a second imaging unit.

FIG. 4 is a flow chart illustrating the operation of mode selection of image capture by the second imaging unit 120. When the user performs a menu operation and the like by the touch panel 117, and selects the photographing processing by the second imaging unit 120 (image-capture processing), the present processing is started.

When the present processing is started, the illumination sensor 109 is activated and detects the illumination of the ambient environment of the information processing device 100 (S401). When the detected value by the illumination sensor 109 is the predetermined value or more (Yes in S402), that is, when the ambient brightness is the predetermined brightness or more, the image-capture processing by a normal mode is performed (S403). In addition, when the detected value by the illumination sensor 109 is the predetermined value or less (No in S402), that is, when the ambient brightness is the predetermined brightness or less, the image-capture processing by a dark-place mode is performed (S404). The image-capture processing in each of the modes will be described in detail below. It should be noted that although the case where the illumination sensor 109 is activated when the processing photographed by the second imaging unit 120 is selected is exemplified here, the processing may be started from S402 when the processing photographed by the second imaging unit 120 is selected in a state where the illumination sensor is already activated.

Figure 5:
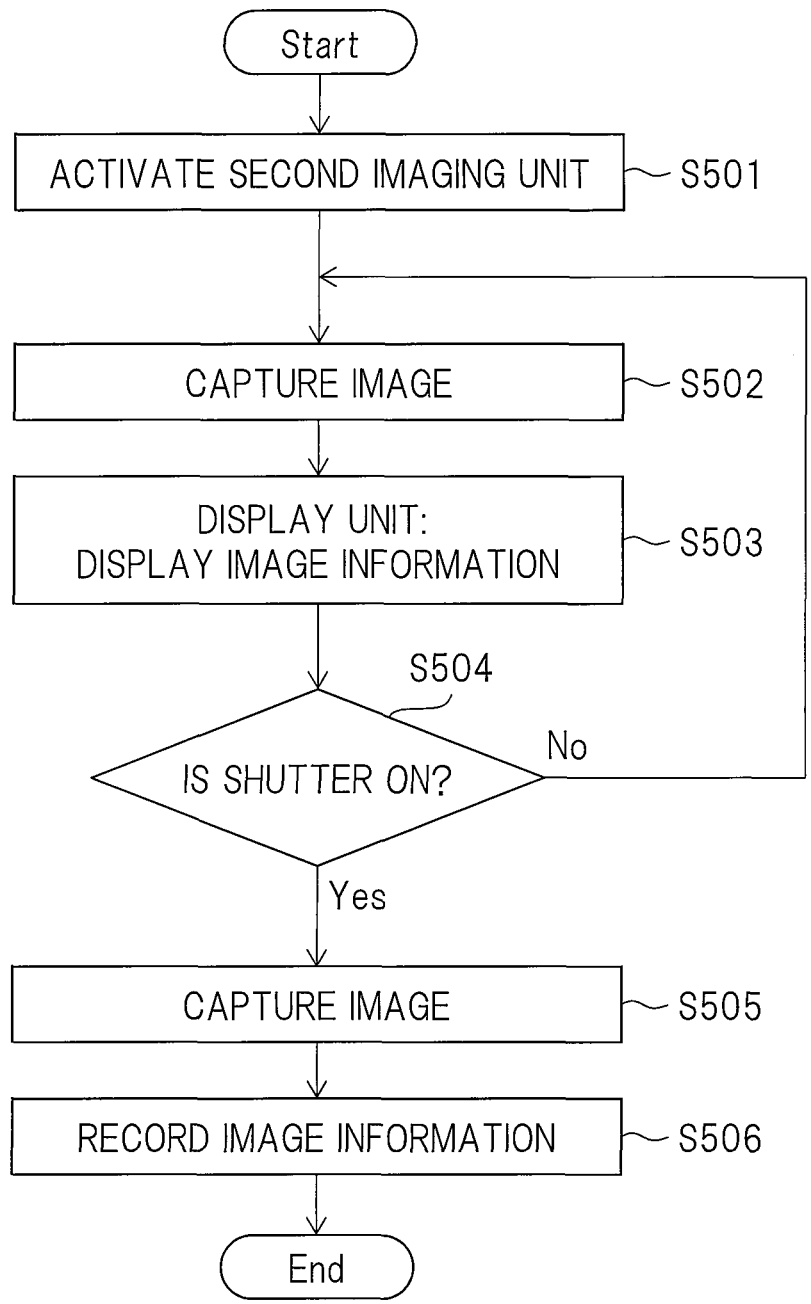
FIG. 5 is a flow chart illustrating the operation of the image-capture processing in a normal mode.
Figure 6:
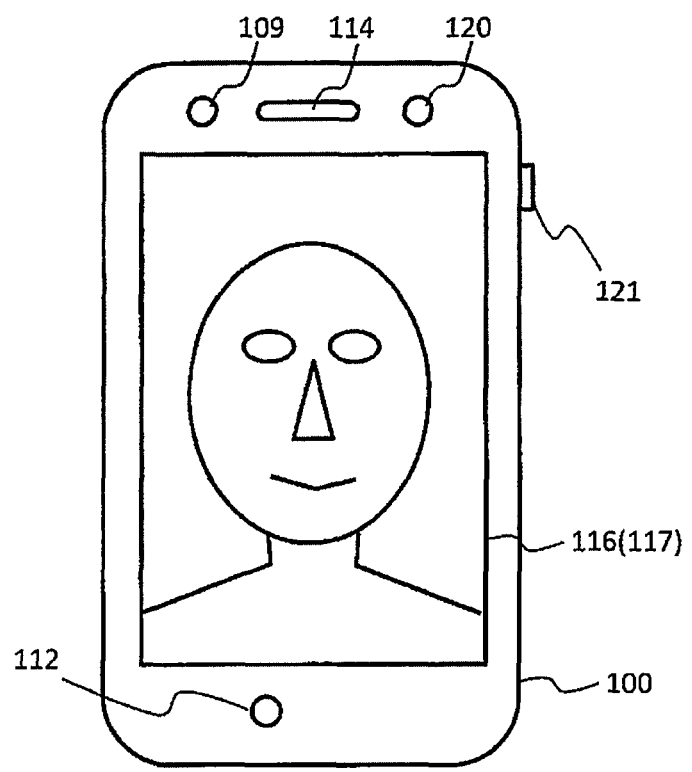
FIG. 6 is a diagram illustrating a display example of a display unit in the normal mode.

FIG. 5 is a flow chart illustrating the operation of the image-capture processing in the normal mode (S403 in FIG. 4). The second imaging unit 120 is activated (S501), and the capture of the image information by the second imaging unit 120 is performed (S502). The image information captured by the second imaging unit 120 is through-displayed on the display unit 116 (S503). As a result, the display unit 116 functions as a viewfinder, and the user can check the composition to be photographed by the second imaging unit 120. FIG. 6 is a diagram illustrating a display example of the display unit 116 in the normal mode. As shown in FIG. 6, the image information captured by the second imaging unit 120 is through-displayed on the entire display unit 116. The user checks the display unit 116, adjusts the position of the information processing device 100 so as to obtain a desired composition, and presses the operation button. 121 configured to function as a shutter button. If detecting that the operation button 121 is pressed (Yes in S504), the information processing device 100 captures the image information by the second imaging unit (S505), performs the predetermined processing by the image processing unit 118, and subsequently records the image information, for example, in the storage 104 (S506) to end the processing.

In the step S504 of detecting that the operation button 121 is pressed, if the detection cannot be achieved (No in S504), the step of capturing the image information (S502) and the step of displaying the captured image information (S503) are repeated. That is, until the operation button 121 is pressed, the image information captured by the second imaging unit 120 is through-displayed on the display unit 116.

Figure 7:
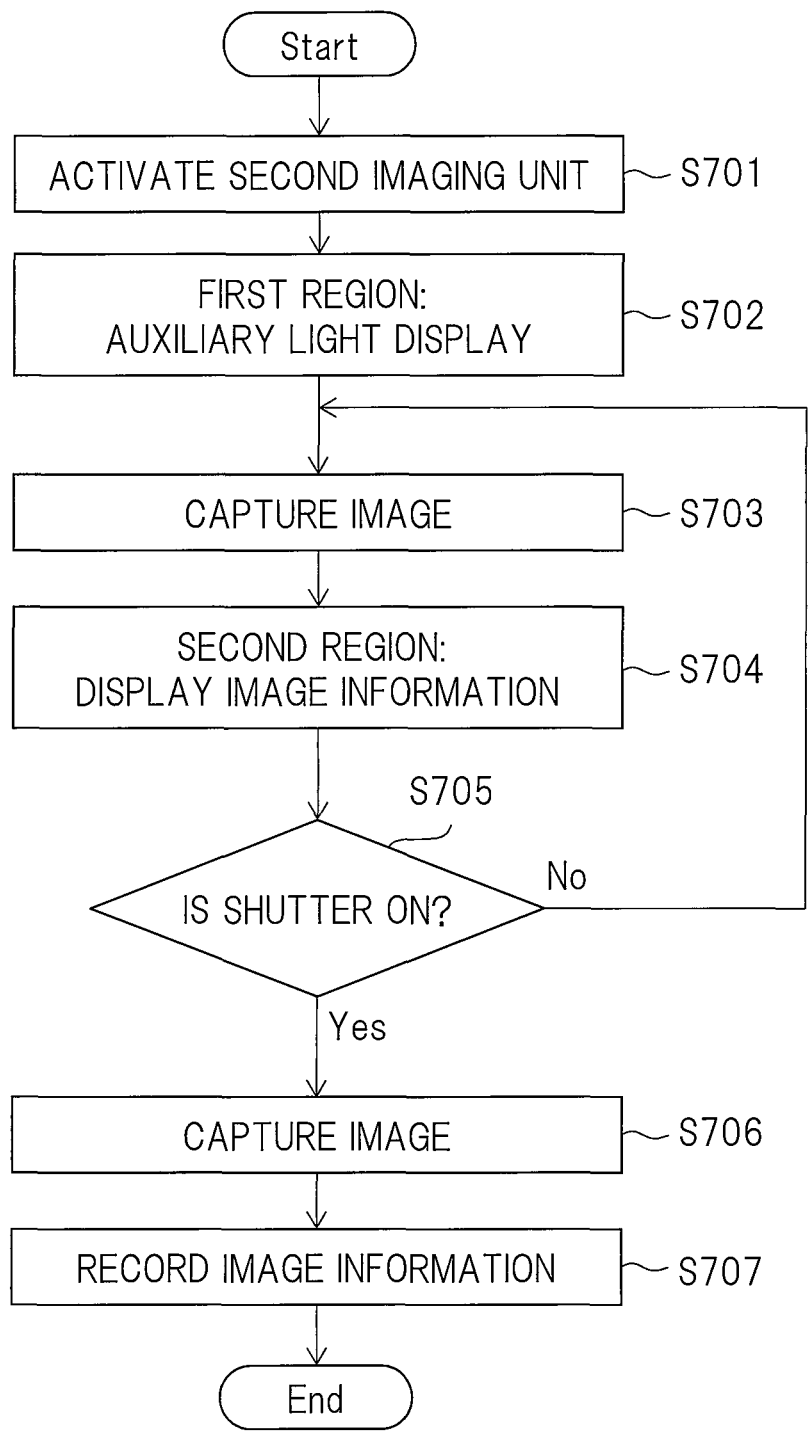
FIG. 7 is a flow chart illustrating the operation of the image-capture processing in a dark-place mode.

FIG. 7 is a flow chart illustrating the operation of the image-capture processing (S404 in FIG. 4) in the dark-place mode. The second imaging unit 120 is activated (S701), and a first region 161 of the display unit 116 is set as an auxiliary light display of displaying in approximately the same color (for example, white and the like) (S702). The details of the auxiliary light display will be described below. Next, the capture of the image information is performed by the second imaging unit 120 (S703), and the image information captured by the second imaging unit 120 is through-displayed in a second region 162 of the display unit 116 (S704).

Figure 8:
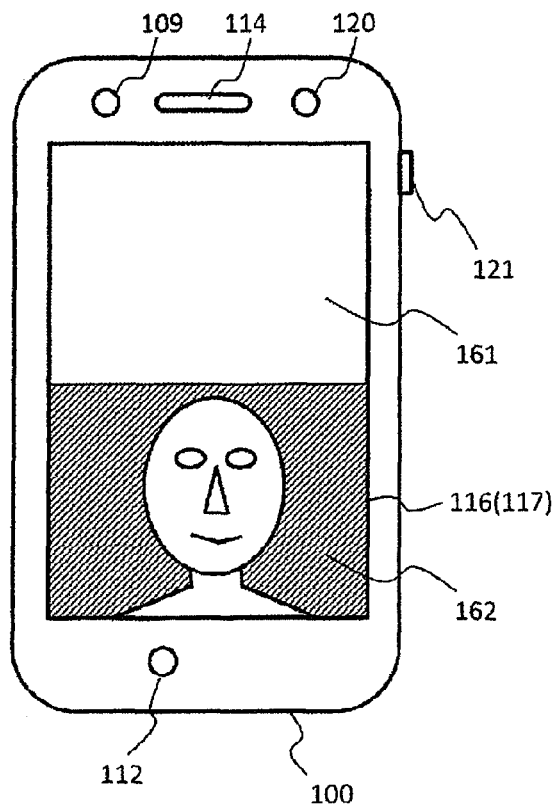
FIG. 8 is a diagram illustrating a display example of the display unit in the dark-place mode.

Here, the first region 161 and the second region 162 will be described. FIG. 8 is a diagram illustrating a display example of the display unit 116 in the dark-place mode. As shown in FIG. 8, the display unit 116 is divided into a plurality of regions (two in this case). The auxiliary light display in the first region 161 is intended to display the entire region in approximately the same color as described above, and functions as the auxiliary light. As for the auxiliary light display, when the display unit 116 is, for example, a device including three color pixels of R, G, and B like the liquid crystal panel, each of the pixels of R, G, and B is made to have the image signal with the predetermined gradation. For example, when white is displayed, each gradation of R, G, and B is set as approximately the same. In addition, in the second region 162, the image information captured by the second imaging unit 120 is through-displayed, whereby the second region 162 functions as a viewfinder. It should be noted that although the example where the first region for the auxiliary light display is set to be the upper part of the display unit and the second region for the through display is set to be the lower part of the display unit is described here, the present invention is not limited to this; for example, the first region may be disposed so as to surround the second region, and the first region may be disposed on any one of left, right, top, and bottom sides of the second region. In addition, the area for the auxiliary light display may be appropriately adjusted so that the subject can be more clearly photographed in response to the subject recognition result from the through image.

Figure 9:
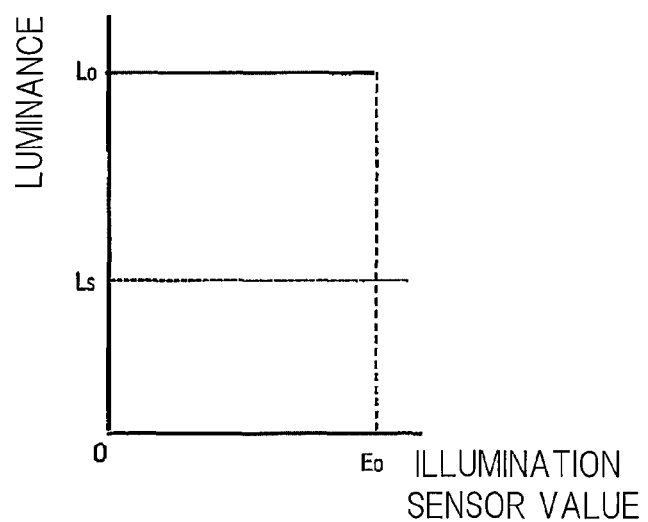
FIG. 9 is a diagram illustrating a relationship example between a value detected by an illumination sensor and luminance of an auxiliary light display in a first region, in the dark-place mode.

Next, luminance of the auxiliary light display will be described. FIG. 9 is a diagram illustrating a relationship example between a value detected by the illumination sensor 109 and the luminance of the auxiliary light display, in the first region 161 in the dark-place mode. When the value of the illumination sensor 109 is the predetermined value ($E_0$ here) or less, the mode is determined to be the dark-place mode, and the first region 161 is set as the auxiliary light display at luminance $L_0$. The value of the luminance $L_0$ is the maximum value of the luminance displayable on the display unit 116. For example, when the display unit 116 is the device such as a liquid crystal including three color pixels of R, G, and B, the value of the luminance $L_0$ corresponds to a state where the gradation of each of the pixels of R, G, and B is maximized. The information processing device 100 has a function of adjusting and setting the luminance of the display unit 116. When the luminance setting of the display unit 116 is used at its maximum, the display is too bright; therefore the setting value with reduced luminance to some extent (here, $L_s$) is used in many cases, during the normal use. When the first region 161 is auxiliary-light-displayed in the setting value $L_s$ with reduced luminance, there are cases where the light quantity for illuminating the subject is insufficient, and the clear image information cannot be captured. As a result, even in the case of the setting with reduced luminance of the display unit 116, the subject can be brightly illuminated and clearly photographed by the second imaging unit 120. It should be noted that when the value of the illumination sensor 109 is the predetermined value $E_0$ or more, the mode is determined to be the normal mode, and the luminance in the first region 161 is $E_0$ or less only.

The user checks the image information through-displayed in the second region 162, adjusts the position of the information processing device 100 so as to obtain a desired composition, and presses the operation button 121 configured to function as a shutter button. When detecting that the operation button 121 is pressed (Yes in S705), the information processing device 100 captures the image information by the second imaging unit (S706), performs the predetermined processing by the image processing unit 118, and subsequently records the image information, for example, in the storage 104 (S707) to end the processing.

In the step S705 of detecting that the operation button 121 is pressed, if the detection cannot be achieved (No in S705), the step of capturing the image information (S703) and the step of displaying the captured image information in the first region 161 (S704) are repeated. That is, until the operation button 121 is pressed, the image information captured by the second imaging unit 120 is through-displayed on the display unit 116.

According to the above description, in a dark environment, the auxiliary light display in the first region 161 functions as illumination and brightly illuminates the subject; therefore the composition of the image information captured by the second imaging unit 120 can be checked.

In addition, although the example where the luminance in the first region 161 is constant is described as above, the present invention is not limited thereto. For example, as shown in FIG. 10(a), a plurality of (in this case, three of $L_0$, $L_1$, and $L_2$) setting values of luminance in the first region 161 are prepared, and the luminance may be changed step-by-step depending on the value of the illumination sensor 109. In addition, as shown in FIG. 10(b), the value of the luminance in the first region 161 may be changed from $L_3$ to $L_0$ depending on the value of the illumination sensor 109. Thus, the luminance in the first region 161 is changed depending on the value of the illumination sensor 109, whereby the increase of the power consumption, due to the first region 161 used as the auxiliary light display, can be reduced. Furthermore, the glare to the user can be reduced by lowering the luminance in the first region 161. Moreover, the luminance may be controlled depending on the subject recognition result from the through-image, in addition to the luminance control depending on the illumination sensor 109.

It should be noted that although the value of the luminance $L_0$ in the first region 161 is set as the maximum value of the luminance of the display unit 116 in the above embodiment, the present invention is not limited thereto. It is satisfactory if the light quantity required for photographing by the second imaging unit 120 is obtained.

FIG. 11 is a diagram illustrating another display example of the display unit 116 in the dark-place mode. Although, in the above embodiment, an example where the areas of the first region 161 and the second region 162 are approximately equal is described, as shown in FIG. 11, the areas of the first region 161 and the second region 162 may be different. As shown in FIG. 11, the area of the first region 161 is made larger than that of the second region 162, whereby the light quantity in the first region 161 can be increased, and brighter image information can be captured.

In addition, as shown in FIG. 11, a button 122 may be displayed on the display unit 116, and used as the shutter button. In this case, when the user touches the button 122, the image information at the time of the touch is recorded in the storage 104.

FIG. 12 is a diagram illustrating another display example of the display unit 116 in the dark-place mode. FIG. 13 is a diagram illustrating a relationship between the distance from the second region 162 and the luminance in the first region 161. Although an example where the luminance in the first region 161 is set to be identical is described in the above embodiment, the present invention is not limited thereto. As shown in FIGS. 12 and 13, in the first region 161, with respect to the luminance $L_0$ on the side away from the second region 162, the luminance $L_6$ on the side closer to the second region may be reduced, and the inclination of the luminance may be disposed in the long-side direction of the display unit 116. The image information displayed in the second region 162 is an image captured in a dark environment, and thus is an image with low luminance. As shown in the figure, the first region 161 and the second region 162 are adjacent to each other. When the luminance slope is disposed so as to darken the side closer to the second region 162, the luminance difference in the boundary portion between the first region 161 and the second region 162 is reduced; therefore the image information which is through-displayed in the second region 162 is easily visible.

According to the above description, bright image information can be photographed by the second imaging unit 120 even in a dark environment. Furthermore, even when the image information captured by the second imaging unit 120 is displayed on the display unit 116, the first region 161 functions as the illumination for illuminating the subject; therefore the composition can be easily checked. It should be noted that each modification example shown in the present embodiment may be appropriately combined and performed, or may be combined with other embodiments described later.

Second Embodiment

The information processing device 100 in a second embodiment will be described. The internal configuration, the external appearance, and the like of the information processing device 100 are equivalent to those in the first embodiment; therefore these are also used in this second embodiment, and the description thereof will be appropriately omitted. In addition, the operation of the mode selection of the image capture by the second imaging unit 120, and the image-capture processing in the normal mode are also equivalent to those in the first embodiment; therefore these operation and processing are also used herein, and the description thereof will be appropriately omitted.

FIG. 14 is a flow chart illustrating the operation of the image-capture processing in the dark-place mode in the second embodiment. The second imaging unit 120 is activated (S1201), and the first region 161 of the display unit 116 is set as the auxiliary light display (S1202). Next, the capture of the image information is performed by the second imaging unit 120 (S1203), and the image information captured by the second imaging unit 120 is through-displayed in the second region 162 of the display unit 116 (S1204). The user checks the second region 162, adjusts the position of the information processing device 100 so as to obtain a desired composition, and presses the operation button 121 configured to function as a shutter button. If detecting that the operation button 121 is pressed (Yes in S1205), the information processing device 100 sets the entire display unit 116 as the auxiliary light display (S1206). The information processing device 100 captures the image information by the second imaging unit (S1207), performs the predetermined processing by the image processing unit 118, and subsequently records the image information in the storage 104 (S1208) to end the processing. If the operation button 121 cannot be detected to be pressed (No in S1205), the step of capturing the image information (S1203) and the step of displaying the captured image information in the first region 161 (S1204) are repeated. That is, until the operation button 121 is pressed, the image information captured by the second imaging unit 120 is through-displayed on the display unit 116.

The difference of the operation of the present second embodiment from that of the first embodiment lies in that if the operation button 121 functioning as a shutter button is detected to be pressed (Yes in S1205), the entire display unit 116 is set as the auxiliary light display (S1206), and the image information is captured by the second imaging unit 120 (S1207). When the image information to be recorded in the storage 104 is captured, there is no need to check the composition; therefore there is no problem even if the entire display unit 116 is set as the auxiliary light display. By increasing the area of the auxiliary light display, when the image information is captured (S1207), the light quantity for illuminating the subject can be increased; therefore clearer image information can be recorded.

According to the above description, in a dark environment, the auxiliary light display in the first region 161 functions as illumination and brightly illuminates the subject; therefore the composition of the image information captured by the second imaging unit 120 can be checked. In addition, when the image information to be recorded in the storage 104 is captured, the entire display unit 116 is set as the auxiliary light display, whereby clearer image information can be recorded.

Third Embodiment

The information processing device 100 in a third embodiment will be described.

The internal configuration, the external appearance, and the like of the information processing device 100 are equivalent to those in the first embodiment; therefore these are also used in this third embodiment, and the description thereof will be appropriately omitted. In addition, the operation of the mode selection of the image capture by the second imaging unit 120 and the image-capture processing in the normal mode are also equivalent to those in the first and the second embodiments; therefore these operation and processing are also used herein, and the description thereof will be appropriately omitted.

FIG. 15 is a flow chart illustrating the operation of the image-capture processing in the dark-place mode in the third embodiment. The second imaging unit 120 is activated (S1301), and the first region 161 of the display unit 116 is set as the auxiliary light display at a first luminance $L_4$ (S1302). Next, the capture of the image information is performed by the second imaging unit 120 (S1303), and the image information captured by the second imaging unit 120 is through-displayed in the second region 162 of the display unit 116 (S1304). The user checks the second region 162, adjusts the position of the information processing device 100 so as to obtain a desired composition, and presses the operation button 121 configured to function as a shutter button. When detecting that the operation button 121 is pressed (Yes in S1305), the information processing device 100 sets the first region 161 of the display unit 116 as the auxiliary light display at a second luminance $L_5$ (S1306). The information processing device 100 captures the image information by the second imaging unit (S1307), performs the predetermined processing by the image processing unit 118, and subsequently records the image information in the storage 104 (S1308) to end the processing. If the operation button 121 cannot be detected to be pressed (No in S1305), the step of capturing the image information (S1303) and the step of displaying the captured image information in the first region 161 (S1304) are repeated. That is, until the operation button 121 is pressed, the image information captured by the second imaging unit 120 is through-displayed on the display unit 116.

Next, the first luminance $L_4$ and the second luminance $L_5$ will be described. FIG. 16 is a diagram illustrating a relationship between the time from the start of the present processing and the luminance in the first region 161. The time $T_1$ is the time when the step of setting the first region 161 as the auxiliary light display at the first luminance $L_4$ (S1302) is performed. The time $T_2$ is the time when the step of setting the first region 161 as the auxiliary light display at the second luminance $L_5$ (S1306) is performed. The time $T_3$ is the time when the present processing is ended.

As shown in the figure, the second luminance $L_5$ corresponds to the luminance $L_0$ in the first embodiment, and is the maximum value of the luminance of the display unit 116. The first luminance $L_4$ is set to a small value with respect to the second luminance $L_5$. The time $T_1$ to $T_2$ when the luminance in the first region 161 is the first luminance $L_4$ is the time when the user performs the process of checking the composition of the image information captured by the second imaging unit 120 by using the image information through-displayed in the second region 162. In this case, the user only checks the composition; therefore there is no particular problem even with somewhat dark image information.

In addition, in the step of capturing the image information to be recorded in the storage 104 (S1307), the luminance in the first region 161 is the second luminance $L_5$. Thus, when the image information to be recorded in the storage 104 is captured, the luminance in the first region 161 is high; therefore the subject can be illuminated brightly, and clear image information can be recorded in the same way as in the first embodiment.

According to the above description, in a dark environment, the auxiliary light display in the first region 161 functions as illumination and brightly illuminates the subject; therefore the composition of the image information captured by the second imaging unit 120 can be checked. In addition, during the check of the composition, the glare to the user can be reduced by lowering the luminance in the first region 161, and the increase in power consumption caused by the setting of the first region 161 as the auxiliary light display can be reduced, by reducing the time period for illumination at luminance $L_5$.

Fourth Embodiment

The information processing device 100 in a fourth embodiment will be described. The internal configuration, the external appearance, and the like of the information processing device 100 are equivalent to those in the first embodiment; therefore these are also used in this fourth embodiment, and the description thereof will be appropriately omitted. In addition, the operation of the mode selection of the image capture by the second imaging unit 120 and the image-capture processing in the normal mode are also equivalent to those in the first to the third embodiments; therefore these operation and processing are also used herein, and the description thereof will be appropriately omitted.

FIG. 17 is a flow chart illustrating the operation of the image-capture processing in the dark-place mode in the fourth embodiment. The second imaging unit 120 is activated (S1501), and the first region 161 of the display unit 116 is set as the auxiliary light display at the first luminance $L_4$ (S1502). Next, the capture of the image information is performed by the second imaging unit 120 (S1503), and the image information captured by the second imaging unit 120 is through-displayed in the second region 162 of the display unit 116 (S1504). The user checks the second region 162, adjusts the position of the information processing device 100 so as to obtain a desired composition, and presses the operation button 121 configured to function as a shutter button. When detecting that the operation button 121 is pressed (Yes in S1505), the information processing device 100 sets the entire display unit 116 as the auxiliary light display at the second luminance $L_5$ (S1506). The information processing device 100 captures the image information by the second imaging unit (S1507), performs the predetermined processing by the image processing unit 118, and subsequently records the image information in the storage 104 (S1508) to end the processing. If the operation button 121 cannot be detected to be pressed (No in S1505), the step of capturing the image information (S1503) and the step of displaying the captured image information in the first region 161 (S1504) are repeated. That is, until the operation button 121 is pressed, the image information captured by the second imaging unit 120 is through-displayed on the display unit 116.

The difference of the operation of the present fourth embodiment from that of the third embodiment lies in that if the operation button 121 as a shutter button is detected to be pressed (Yes in S1505), the entire display unit 116 is set as the auxiliary light display (S1506), and the image information is captured by the second imaging unit 120 (S1507). When the image information to be recorded in the storage 104 is captured, there is no need to check the composition; therefore there is no problem even if the entire display unit 116 is set as the auxiliary light display. By increasing the area of the auxiliary light display, when the image information is captured (S1507), the light quantity for illuminating the subject can be increased; therefore clearer image information can be recorded.

According to the above description, in a dark environment, the auxiliary light display in the first region 161 functions as illumination and brightly illuminates the subject; therefore the composition of the image information captured by the second imaging unit 120 can be checked. In addition, during the check of the composition, the glare to the user can be reduced by lowering the luminance in the first region 161, and the increase in power consumption caused by the setting of the first region 161 as the auxiliary light display can be reduced, by reducing the time period for illumination at luminance $L_5$. Furthermore, when the image information to be recorded in the storage 104 is captured, the entire display unit 116 is set as the auxiliary light display, whereby the light quantity of the illumination for illuminating the subject can be increased; therefore clearer image information can be recorded.

Fifth Embodiment

The information processing device 100 in a fifth embodiment will be described. The internal configuration, the external appearance, and the like of the information processing device 100 are equivalent to those in the first embodiment; therefore these are also used in this fifth embodiment, and the description thereof will be appropriately omitted. In addition, the operation of the mode selection of the image capture by the second imaging unit 120 and the image-capture processing in the normal mode are also equivalent to those in the first to the fourth embodiments; therefore these operation and processing are also used herein, and the description thereof will be appropriately omitted.

FIG. 18 is a flow chart illustrating the operation of the image-capture processing in the dark-place mode in the fifth embodiment. The second imaging unit 120 is activated (S1801), and the capture of the image information by the second imaging unit 120 is performed (S1802). Next, the light-quantity increase processing on the captured image information is performed by the image processing unit 118 (S1803), and the image information is displayed on the display unit 116 (S1804). The light-quantity increase processing means the processing for increasing the total light-quantity emitted from the display unit 116.

FIG. 19 is a diagram illustrating an example of the light-quantity increase processing characteristics. As compared to the characteristic of the input signal that is equal to the output signal where the light-quantity increase processing is not performed (the dashed line 200), the characteristic where the light-quantity increase processing is performed (the solid line 201) is shifted so as to be increased by $G_{o2}$ from the low level to the high level. Due to the present processing, the image information displayed on the display unit 116 is displayed in a state where the luminance of each of the pixels is increased; therefore the light-quantity to be emitted is increased, and functions as the illumination for illuminating the subject.

FIG. 20 is a diagram illustrating a state of the display unit 116 in the step of the display (S1804). As shown in the figure, the light-quantity increase processing is performed on the image information captured from the second imaging unit 120, and the image information is displayed on the entire display unit 116. Although there is unevenness as the illumination for illuminating the subject because the luminance and the color are different for each pixel within the region of the display unit 116, here, the composition (the position of the subject) is only checked; therefore there is no particular influence.

The user checks the display unit 116, adjusts the position of the information processing device 100 so as to obtain a desired composition, and presses the operation button 121 as a shutter button. When detecting that the operation button 121 is pressed (Yes in S1805), the information processing device 100 sets the display unit 116 as the auxiliary light display (S1806), and captures the image information by the second imaging unit (S1807). The information processing device 100 performs the predetermined processing on the captured image information by the image processing unit 118, and subsequently records the image information in the storage 104 (S1808) to end the processing. Thus, when the image information to be recorded in the storage 104 is captured, the entire display unit 116 is set as the auxiliary light display; therefore the subject can be illuminated by uniform illumination, and clear image information can be recorded.

In the step of detecting that the operation button 121 as the shutter button is pressed (S1805), if the detection cannot be achieved (No in S1805), the processing returns to the step of capturing the image information (S1802). That is, until the operation button 121 is pressed, the processes of performing the light-quantity increase processing on the image information captured by the second imaging unit 120, and of displaying the image information on the display unit 116 are repeated.

FIG. 21 is a diagram illustrating another example of the light-quantity increase processing characteristics. In the above light-quantity increase processing, the shift is made so as to be uniformly increased by $G_{o2}$ from the low level to the high level, whereas in the present light-quantity increase processing, the shift amount is reduced as the input increases to the high level. Although the light-quantity increase amount is reduced as compared to the above light-quantity increase processing, a large number of viewable gradations can be taken; therefore there is an advantage in terms of visibility. In addition, the shift amount of the light-quantity increase processing may be changed depending on the value detected by the illumination sensor 109.

The difference of the operation in the present embodiment from the operations in the above-mentioned first to fourth embodiments lies in that the image information on which the light-quantity increase processing is performed is displayed on the display unit 116. As a result, the display unit 116 functions as the illumination for illuminating the subject; therefore the composition can be easily checked. In addition, when the operation button 121 is detected to be pressed, the entire display unit 116 is set as the auxiliary light display, and the image information is captured by the second imaging unit 120. As a result, the image information is captured in a state where the subject is illuminated in uniform illumination with the entire display unit 116 as the auxiliary light display; therefore clear image information can be recorded.

Although in the above first to fifth embodiments, the mode where the image information captured by the second imaging unit 120 is recorded in the storage 104 is described as an example, the present invention is not limited thereto. The present invention can be applied to the mode of photographing by the imaging unit disposed on the surface side where the display unit 116 is mounted (in this case, the second imaging unit 120). For example, the present invention can also be applied to the mode of photographing a face when a key lock function is released by face authentication.

In addition, the luminance during the auxiliary light display and the shift amount of the light-quantity increase processing are gradually increased, and when the image information captured by the second imaging unit 120 obtains the predetermined brightness, such image information may be recorded in the storage 104, or the face authentication may be performed.

In addition, although in the above embodiments, a smartphone is described as an example, the present invention is not limited thereto, and may be applied to, for example, a tablet, a notebook PC, a desktop PC, and the like.

In addition, although a plurality of operation flow charts in the dark-place mode are described in the respective embodiments, the operation in the dark-place mode in the information processing device is not limited to any one of the operation flow charts, a plurality of dark-place modes corresponding to each of the operation flow charts may be provided, and the user may set any one of the dark-place modes in advance.

The present invention is not limited to the foregoing embodiments and but includes various modification examples. For example, the above-described embodiment concretely described the present invention so that the present invention can be easily understood, and thus the present invention is not necessarily limited to the one including all the configurations described in the foregoing. For example, the above-described embodiment concretely described the present invention so that the present invention can be easily understood, and thus the present invention is not necessarily limited to the one including all the configurations described in the foregoing. Moreover, part of the configuration of the embodiment can be subjected to addition/deletion/replacement of other configurations. Furthermore, the configurations described in respective examples may be combined for use.

Also, with respect to each of the configurations, functions, processing units, processing means and the like described above, apart or all thereof may be achieved by hardware such as designing by an integrated circuit for example. Further, each of the configurations, functions and the like described above may be achieved by software by that a processor interprets and executes a program that achieves each of the functions. Information such as the program, table, file and the like achieving each of the functions can be placed in a memory such as a flash memory, or in a storage such as an IC card.

Furthermore, the control lines and information lines supposed to be necessary for explanation are shown, and all of the control lines and information lines in the product are not necessarily shown. It is right thinking that almost all configurations are connected to each other in actual fact.

REFERENCE SIGNS LIST 100 information processing device
109 illumination sensor
116 display unit
119 first imaging unit
120 second imaging unit
161 first region
162 second region

The invention claimed is:

1. An information processing device comprising:
an imaging unit;
a display unit; and
an illumination sensor,
wherein the imaging unit and the display unit are disposed on a first surface side of the information processing device,
wherein there is provided a mode of using at least an area of the display unit to display auxiliary light, in a case of taking an image by the imaging unit when a detected value of the illumination sensor is a predetermined value or less,
wherein a size of the area of the display unit that displays the auxiliary light is adjusted in response to a subject recognition result obtained from video information taken by the imaging unit before taking the image by the imaging unit, and
wherein at the time of taking the image by the imaging unit the entire display of the display unit displays the auxiliary light.

2. The information processing device according to claim 1,
wherein in a case of taking an image by the imaging unit when the detected value of the illumination sensor is the predetermined value or less, image information captured by the imaging unit is displayed in a first region of the display unit, and
image information different from the image information is displayed in a second region of the display unit at a luminance higher than a luminance in the first region.

3. The information processing device according to claim 2,
wherein, the luminance in a first part of the second region closer to the first region is lower than the luminance in a second part of the second region farther from the first region.

4. The information processing device according to claim 2,
wherein the luminance in the second region of the display unit is approximately uniform.

5. The information processing device according to claim 2,
wherein luminance in the second region of the display unit changes depending on a detected value in the illumination sensor.

6. The information processing device according to claim 2,
wherein the second region of the display unit is disposed on any one of left, right, top, and bottom sides of the first region.

7. The information processing device according to claim 1,
wherein the display unit through-displays image information obtained by performing light-quantity increase processing on image information captured by the imaging unit, and is switched to display the auxiliary light at a luminance higher than a luminance of the image information when receiving an instruction from a user so as to record image information captured by the imaging unit in a state of the through-display.

8. An information processing method using an information processing device including an imaging unit, a display unit, and an illumination sensor, the imaging unit and the display unit being disposed on a first surface side of the information processing device, the method comprising the steps of:
detecting illumination by the illumination sensor;
setting a mode of using at least an area of the display unit to display auxiliary light, in a case of taking an image by the imaging unit when a detected value of the illumination sensor is a predetermined value or less; and
adjusting a size of the area of the display unit that displays the auxiliary light in response to a subject recognition result obtained from video information taken by the imaging unit before taking an image by the imaging unit; and
displaying the auxiliary light on the entire display of the display unit at the time of taking the image by the imaging unit.

9. The information processing method according to claim 8, further comprising the step of:
displaying image information captured by the imaging unit in a first region of the display unit, and displaying image information different from the image information in a second region of the display unit, at a luminance higher than a luminance in the first region, when the mode is set.

10. The information processing method according to claim 8, further comprising the step that:
when the mode is set, the display unit through-displays image information obtained by performing light-quantity increase processing on image information captured by the imaging unit, and is switched to display the auxiliary light at a luminance higher than a luminance of the image information when receiving an instruction from a user so as to record image information captured by the imaging unit in a state of the through-display.

* * * * *